(12) United States Patent
Baba (10) Patent No.: US 10,634,108 B2
(45) Date of Patent: Apr. 28, 2020

(54) STARTER

(71) Applicant: DENSO CORPORATION, Kariya, Aichi-pref. (JP)

(72) Inventor: Kousuke Baba, Kariya (JP)

(73) Assignee: DENSO CORPORATION, Kariya (JP)

( * ) Notice: Subject to any disclaimer, the term of this patent is extended or adjusted under 35 U.S.C. 154(b) by 128 days.

(21) Appl. No.: 16/071,936

(22) PCT Filed: Jan. 20, 2017

(86) PCT No.: PCT/JP2017/001968
§ 371 (c)(1),
(2) Date: Jul. 23, 2018

(87) PCT Pub. No.: WO2017/126674
PCT Pub. Date: Jul. 27, 2017

(65) Prior Publication Data
US 2019/0032620 A1    Jan. 31, 2019

(30) Foreign Application Priority Data

Jan. 21, 2016   (JP) .................................. 2016-009575

(51) Int. Cl.
*F02N 11/08*    (2006.01)
*F02N 15/06*    (2006.01)
(Continued)

(52) U.S. Cl.
CPC ............ *F02N 11/0851* (2013.01); *B60K 6/20* (2013.01); *F02N 11/0803* (2013.01);
(Continued)

(58) Field of Classification Search
CPC .. F02N 11/0851; F02N 15/063; F02N 15/065; F02N 15/067; F02N 11/0803;
(Continued)

(56) References Cited

U.S. PATENT DOCUMENTS

2012/0256523 A1\* 10/2012 Fulton ..................... F02N 11/02
310/68 D
2014/0210216 A1   7/2014 Konishi et al.

FOREIGN PATENT DOCUMENTS

| CN | 2198397 Y | 5/1995 |
|----|-----------|--------|
| FR | 2 749 151 B1 | 8/1998 |

(Continued)

*Primary Examiner* — Joseph J Dallo
*Assistant Examiner* — Scott A Reinbold
(74) *Attorney, Agent, or Firm* — Oliff PLC (57) ABSTRACT

In a starter, current is passed through a solenoid to use the generated electromagnetic force when pushing a pinion gear toward a ring gear, so that the ring gear is engaged with the pinion gear. For this purpose, the starter includes an electromagnetic solenoid, a spring for urging the pinion gear in a direction opposite to that of the electromagnetic solenoid, a connecting member connected to the pinion gear, a stopper for limiting movement of the connecting member to a predetermined position. Being urged by the spring, the pinion gear is disengaged from the ring gear, and the connecting member is retracted to a predetermined position. The starter includes a control circuit that implements control of passing a predetermined current through the solenoid after the disengagement but before retraction of the connecting member to the predetermined position.

19 Claims, 9 Drawing Sheets

(51) Int. Cl.
    *B60K 6/20*         (2007.10)
    *F16H 1/06*         (2006.01)
(52) U.S. Cl.
    CPC ........... *F02N 15/06* (2013.01); *F02N 15/063*
        (2013.01); *F02N 15/065* (2013.01); *F02N*
        *15/067* (2013.01); *F16H 1/06* (2013.01); *F02N*
        *11/0866* (2013.01); *F02N 2015/061* (2013.01);
        *F02N 2200/022* (2013.01); *F02N 2200/041*
        (2013.01); *F02N 2200/101* (2013.01); *F02N*
        *2300/106* (2013.01)
(58) Field of Classification Search
    CPC ............... F02N 15/06; F02N 2200/041; F02N
                     2300/106; F02N 11/0866; F02N
                     2200/022; F02N 2015/061; F02N
                  2200/101; B60K 6/20; B60K 6/26; B60K
                    6/24; B60K 2006/4825; F16H 1/06
    USPC ..................................................... 123/179.3
    See application file for complete search history.

(56) References Cited

FOREIGN PATENT DOCUMENTS

| | | |
|---|---|---|
| JP | 2000-204999 A | 7/2000 |
| JP | 2012-144172 A | 8/2012 |
| JP | 2015-086720 A | 5/2015 |
| JP | 2015-094253 A | 5/2015 |

\* cited by examiner

| ENGINE START-UP PERIOD [msec] | ACCELERATOR MANIPULATED VARIABLE [%] | | | | | | |
|---|---|---|---|---|---|---|---|
| | | 0 | 10 | 20 | 40 | 60 | 80 | 100 |
| TEMPORAL VARIATION OF ACCELERATOR MANIPULATED VARIABLE [%/sec] | 0 | 1000 | 900 | 800 | 600 | 500 | 400 | 300 |
| | 10 | 900 | 700 | 600 | 500 | 400 | 300 | 300 |
| | 50 | 700 | 550 | 450 | 400 | 350 | 300 | 300 |
| | 100 | 500 | 400 | 350 | 300 | 300 | 300 | 300 |
| | 500 | 400 | 300 | 300 | 300 | 300 | 300 | 300 |

STARTER

CROSS-REFERENCE TO RELATED APPLICATION

This application is based on Japanese Patent Application No. 2016-009575 filed Jan. 21, 2016, the description of which is incorporated herein by reference.

TECHNICAL FIELD

The present disclosure relates to a starter installed in a vehicle to start an engine.

BACKGROUND ART

PTL 1 describes a starter that independently energizes a solenoid and a motor. The solenoid pushes a pinion gear toward a ring gear which is connected to the output shaft of an engine, and the motor imparts rotation to the pinion gear. Starters are generally configured to push a pinion gear from the initial position so as to engage with a ring gear, and are configured to rotate the pinion gear with a motor so as to rotate the ring gear, thereby starting the engine. In addition to this, according to the configuration described in PTL 1, the current supplied to the solenoid and the motor is adjusted to control pushing and rotation of the pinion gear.

CITATION LIST

Patent Literatures

[PTL 1] JP 2015-86720 A

After start-up of the engine, the pinion gear is disengaged from the ring gear and allowed to retract to the initial position, being urged by an urging member, such as a spring. The present disclosure has focused on an issue of the noise generated when the pinion gear is allowed to retract to the initial position. Specifically, this noise is generated by the collision of a specific member, which is connected to the pinion gear, with a limiting member that limits the movement of the specific member.

SUMMARY

The present disclosure has a main object of minimizing generation of the noise occurring when the specific member connected to the pinion gear is allowed to retract to the predetermined position after being disengaged from the ring gear.

The present configuration is a starter mounted to a vehicle to start an engine, including: a pushing member that pushes a pinion gear toward a ring gear connected to an output shaft of the engine, using an electromagnetic force generated by current being passed through a solenoid to bring the ring gear into engagement with the pinion gear; an urging member that urges the pinion gear in a direction opposite to the direction into which the pinion gear is pushed out by the pushing member; a predetermined member connected to the pinion gear; a first limiting member that limits movement of the predetermined member caused by the urging member, to a predetermined position, before the pinion gear is pushed out by the pushing member; and a control unit that disengages the ring gear from the pinion gear under an urging action of the urging member and implements control of passing a predetermined current through the solenoid when the predetermined member is retracted to the predetermined position, the predetermined current being passed through the solenoid after disengagement of the ring gear from the pinion gear but before retraction of the predetermined member to the predetermined position.

According to the configuration set forth above, the control unit implements control of passing a predetermined current through the solenoid after disengagement of the ring gear from the pinion gear but before retraction of the predetermined member connected to the pinion gear to the predetermined position. Accordingly, the urging force applied by the urging member is reduced. Thus, when the predetermined member connected to the pinion gear retracts to the predetermined position, the impact caused by the collision with the first limiting member is minimized and thus generation of noise is minimized.

DESCRIPTION OF THE EMBODIMENTS

With reference to the drawings, description will be given of some embodiments in which an engine starter related to the present disclosure is applied to a hybrid vehicle.

Figure 1:
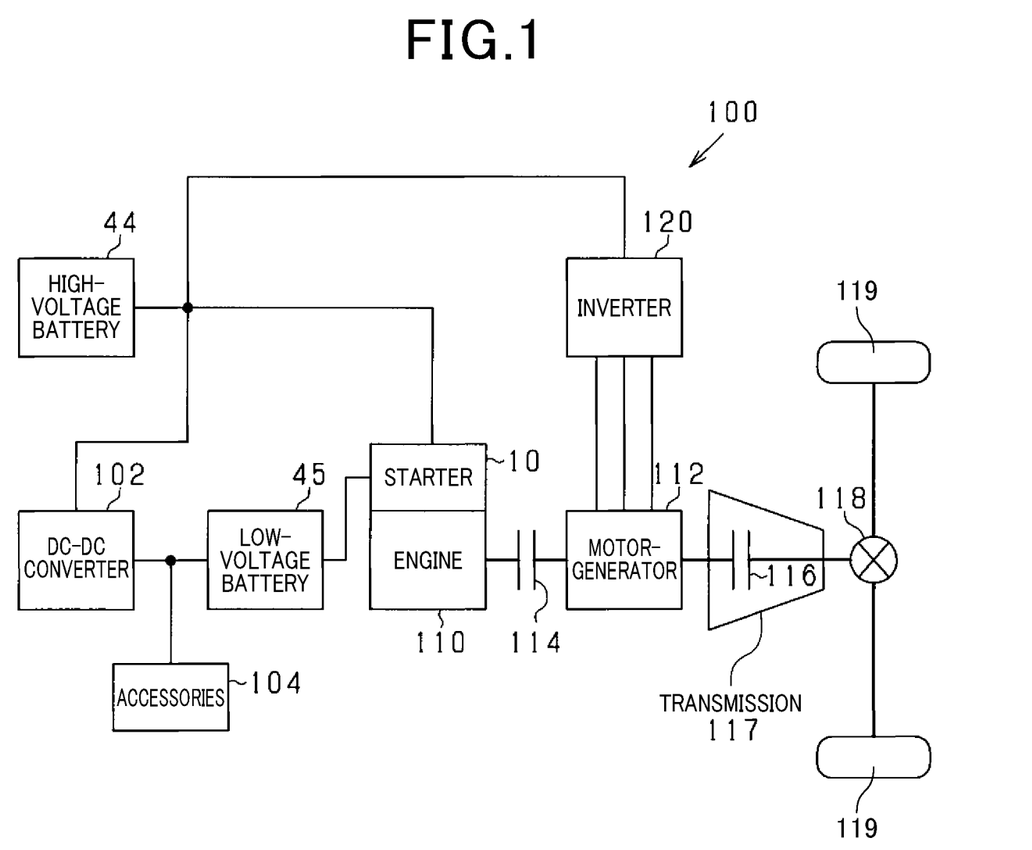
FIG. 1 is a schematic diagram illustrating a configuration of a hybrid vehicle.

FIG. 1 shows a vehicle 100 which is specifically a dual-clutch parallel hybrid vehicle installing an engine 110 and a motor-generator (MG) 112. The engine 110 has an output shaft connected to the output shaft of the motor-generator 112 via a clutch 114. The output shaft of the motor-generator 112 is connected to wheels 119 of the vehicle 100 via a transmission 117 provided with a clutch 116, and via a differential gear 118.

The motor-generator 112 is connected to a high-voltage battery 44 via an inverter 120 for motor-generator, so that the output shaft is driven, with electrical power supplied from the high-voltage battery 44. Also, the motor-generator 112 generates electrical power, with the output shaft being driven by the engine 110, so that electric charge is applied to the high-voltage battery 44.

The vehicle 100 also includes a low-voltage battery 45 whose output voltage is lower than that of the high-voltage battery 44. The low-voltage battery 45 supplies power to other accessories 104 than the motor-generator 112. The high- and low-voltage batteries 44 and are connected to each other via a DC-DC converter 102. Specifically, the high-voltage battery 44 is a battery pack of lithium ion secondary batteries with an output voltage of 200 V. The low-voltage battery 45 is a lead battery with an output voltage of 12V. Other batteries may be used for the high- and low-voltage batteries 44 and 45.

Figure 2:
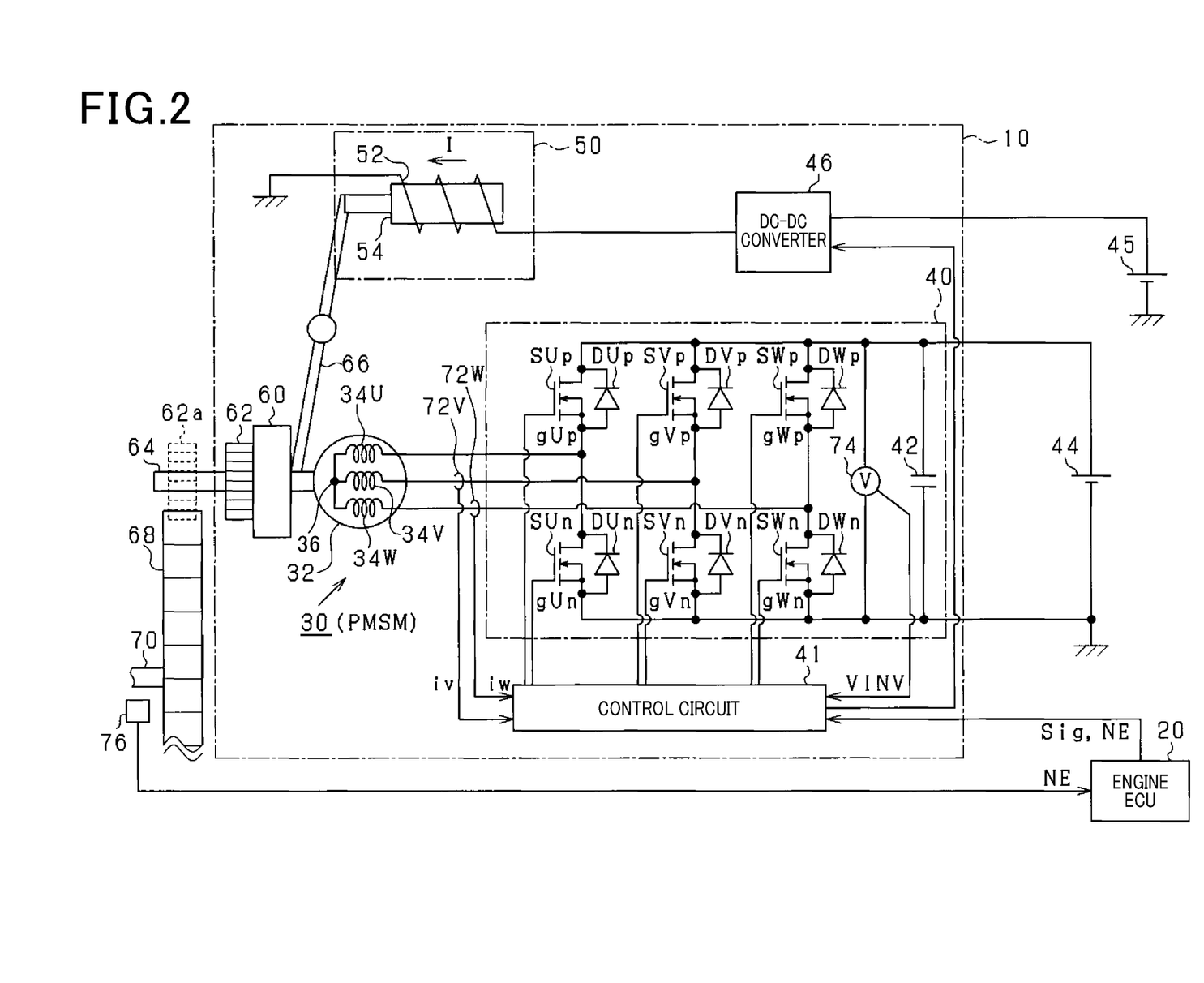
FIG. 2 is a schematic diagram illustrating an electrical configuration of a starter.

The engine 110 is provided with a starter 10 to which electrical power is ensured to be supplied from the high- and low-voltage batteries 44 and 45. Referring to FIG. 2, the configuration of the starter 10 will be specifically described.

As shown in FIG. 2, the vehicle 100 includes the starter 10, and an electronic control unit (termed ECU hereinafter) 20 controlling the engine 110. The starter 10 includes a motor 30, an inverter 40, a control circuit 41 and an electromagnetic solenoid 50.

The motor 30 is a three-phase AC rotary machine and includes a rotor 32, and U-, V- and W-phase stator coils 34U, 34V and 34W. The U-, V- and W-phase stator coils 34U, 34V and 34W have respective ends which are connected to each other at a neutral point 36. The motor 30 used in the present embodiment is a permanent magnet synchronous motor (PMSM).

The inverter 40 is a three-phase inverter including three sets of serial connections of switching elements, in which ¥-phase upper-arm switching elements S¥p (¥=U, V or W) are serially connected to respective ¥-phase lower-arm switching elements S¥n. Specifically, the ¥-phase upper- and lower-arm switching elements S¥p and S¥n have a connecting point therebetween which is connected to an end of the ¥-phase stator coil 34¥, the end being one (¥-phase terminal of the motor 30) on a side opposite to the end that is connected to the neutral point 36. The switching element S¥# (#=p or n) used in the present embodiment is a MOS-FET (metal-oxide-semiconductor field-effect transistor) that is a semiconductor switching element. The switching element S¥# is connected in inverse parallel to a diode D¥#.

The inverter 40 has a pair of input terminals across which a high-voltage battery 44 is connected via a capacitor 42. The electromagnetic solenoid 50 (corresponding to the pushing member) includes a solenoid coil 52 having an end connected to the low-voltage battery 45 via a DC-DC converter 46. The solenoid coil 52 has another end which is grounded. The DC-DC converter 46 is controlled by the control circuit 41 so as to implement constant current control under which current I is passed through the solenoid coil 52 becomes a predetermined current. It should be noted that the DC-DC converter 46 may implement constant voltage control under which the output voltage becomes a predetermined voltage. The DC-DC converter 46, for example, is a known chopper circuit. Besides the solenoid coil 52, the electromagnetic solenoid 50 includes a plunger 54 (movable core).

The engine ECU 20 acquires an output signal from a rotation angle sensor 76 provided to a crank shaft 70 of the engine 110 to acquire the rotation angle of the crank shaft 70 and the engine speed (NE).

The control circuit 41 (corresponding to the control unit) provided to the starter 10 has a controlled object which is the inverter 40 i.e. the ¥-phase upper- and lower-arm switching elements S¥p and S¥n. The control circuit 41 also has a controlled object which is the DC-DC converter 46. The control circuit 41 acquires currents iv and iw of V and W phases respectively from current sensors 72V and 72W each of which detects an output current of the inverter 40. The control circuit 41 acquires an input voltage VINV from a voltage sensor 74 which detects an input voltage of the inverter 40.

The control circuit 41 of the inverter 40 receives inputs of a detected engine speed (NE) and an activation request signal (Sig) for the starter 10, from the engine ECU 20. Based on the detected engine speed (NE) and the activation request signal (Sig) for the starter 10, the control circuit 41 adjusts the output current and the output voltage of the inverter 40 and the DC-DC converter 46 to control the starter 10. The control circuit 41 is provided with a microcomputer which is made up of components such as a CPU (central processing unit), a ROM (read only memory) and a RAM (random access memory).

Figure 3:
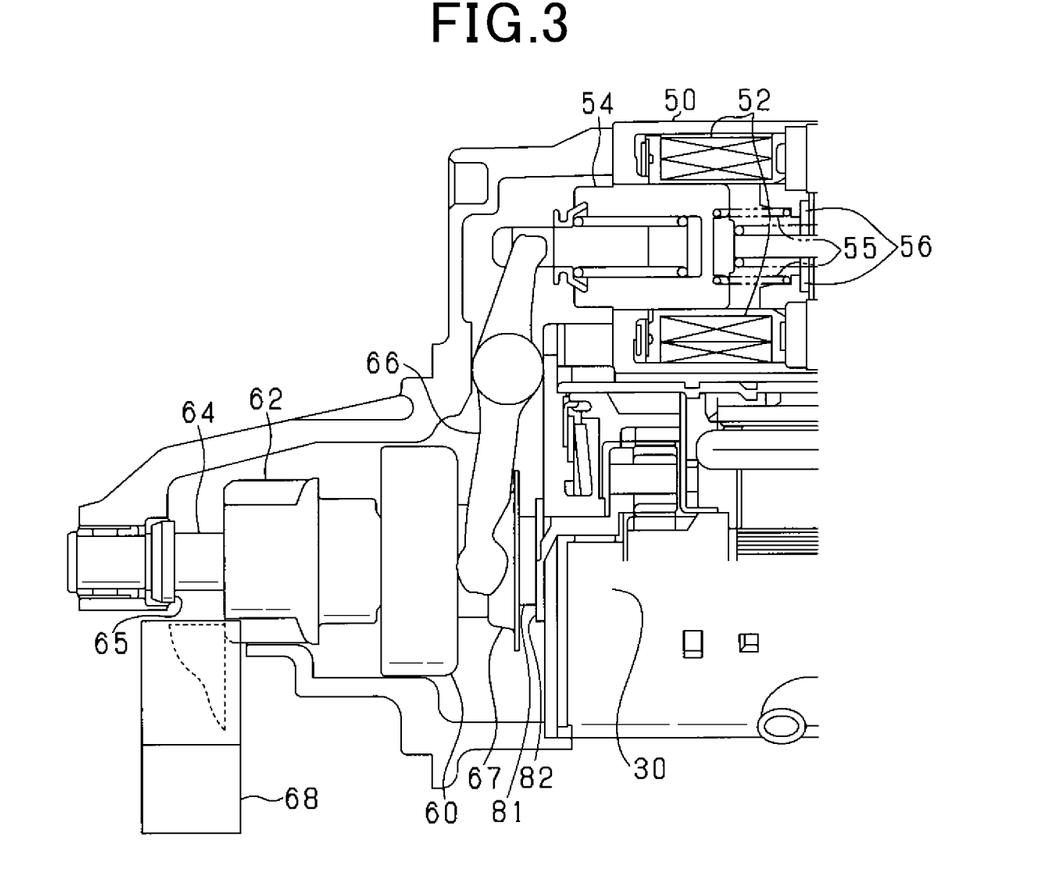
FIG. 3 is a schematic diagram illustrating a mechanical configuration of the starter.

FIG. 3 is a schematic diagram illustrating a structure of the starter 10. The starter 10 includes a one-way clutch 60, a pinion gear 62, a rotary shaft 64, a stop ring 65, and a shift lever 66. The pinion gear 62 is connected to the motor 30 via the one-way clutch 60 and a connecting member 67. The one-way clutch 60 transmits torque from the motor 30 to the pinion gear 62 only when a non-negative relative rotation speed is obtained, as a result of subtracting the rotation speed of the pinion gear 62 from the rotation speed of an output shaft 81 of the motor 30. The one-way clutch 60 serves as a unidirectional transmission mechanism that does not transmit torque between the motor 30 and the pinion gear 62 when a negative relative rotation speed is obtained.

The pinion gear 62 is provided coaxially with the output shaft 81 of the motor 30. As shown in FIG. 2, the pinion gear 62 is provided so as to be movable between the position indicated with the dotted lines, where the pinion gear 62 engages with a ring gear 62 that is directly connected to the crank shaft 70 of the engine 110 (termed connection position (indicated by a reference sign 62a) hereinafter), and the position indicated with the solid lines, where the pinion gear 62 is disengaged from the ring gear 68 (termed disconnection position or initial position hereinafter).

Specifically, if the electrical power output of the DC-DC converter 46 is stopped and the solenoid coil 52 is not energized, the pinion gear 62 is at the disconnection position. If the solenoid coil 52 is energized by the electrical power output of the DC-DC converter 46, the electromagnetic force of the electromagnetic solenoid 50 causes the plunger 54 to move in a predetermined direction (toward the shift lever 66). With this movement, the pinion gear 62 is pushed toward the connection position from the disconnection position via the shift lever 66, for engagement with the ring gear 68. In the present specification hereinafter, the solenoid coil 52 being energized may be referred to as the electromagnetic solenoid 50 being activated.

As shown in FIG. 3, the pinion gear 62 is connected to the coaxially provided connecting member 67 (corresponding to the predetermined member). The connecting member 67 has an inner periphery provided with helical splines, or spiral grooves (not shown). The output shaft 81 of the motor 30 is helically provided with teeth that are fitted to the helical splines provided to the inner periphery of the connecting member 67. Torque of the output shaft 81 of the motor 30 is transmitted to the connecting member 67 and the pinion gear 62 via the helical splines. The connecting member 67 and the pinion gear 62, when pushed by the shift lever 66, move along the helical splines of the connecting member 67. The output shaft 81 of the motor 30 is provided separately from but coaxially with the rotary shaft 64 of the pinion gear 62.

Being moved to the connection position, the pinion gear 62 is able to engage with the ring gear 68. When the pinion gear 62 is rotated by the motor 30 in a state of being engaged with the ring gear 68, initial rotation is imparted to the crank shaft 70 of the engine 110. That is, the engine is cranked.

The stop ring 65 is provided around the rotary shaft 64. When the electromagnetic solenoid 50 is activated and the pinion gear 62 is pushed out, the pinion gear 62 comes into contact with the stop ring 65 after starting engagement with the ring gear 68. The stop ring 65 (corresponding to the second limiting member), when brought into contact with the pinion gear 62, limits the movement of the pinion gear 62 to fix the pinion gear 62 at the connection position.

The plunger 54 is connected to a spring 55 (corresponding to the urging member). The spring 55 urges the plunger 54 to move in a direction opposite to the direction of the movement caused by the electromagnetic solenoid 50 (in a direction distancing from the shift lever 66). After completion of cranking, energization of the solenoid coil 52 is stopped and only the urging force of the spring 55 acts on the plunger 54. Accordingly, the plunger 54 is moved in a direction of distancing itself from the shift lever 66. As a result, the pinion gear 62 retracts from the connection position to the disconnection position via the shift lever 66.

In the present embodiment, the ring gear 68 is directly connected, as mentioned above, to the crank shaft 70. Accordingly, the rotation direction of the ring gear 68 agrees with that of the crank shaft 70. Also, in the present embodiment, the rotary shaft 64 and the crank shaft 70 are provided such that the axis line of the rotation center of the rotary shaft 64 is parallel to that of the rotation center of the crank shaft 70. Thus, in the state where the pinion gear 62 is in engagement with the ring gear 68, the rotation direction of the ring gear 68 is the reverse of that of the pinion gear 62. In the present embodiment, in the state where the rotor 32 is rotated by the activation of the motor 30 with the pinion and ring gears 62 and 68 being engaged with each other, the rotation directions of these gears are respectively defined to be normal rotation directions.

Figure 4:
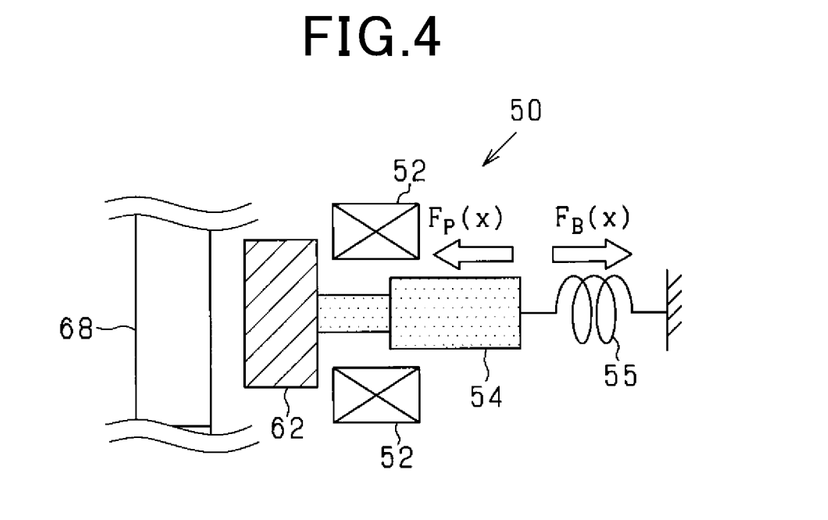
FIG. 4 is a diagram illustrating a pushing force and an urging force acting on a pinion gear.

FIG. 4 shows a pushing force FP of the electromagnetic solenoid 50 and an urging force FB of the spring 55, acting on the pinion gear 62. The pushing force FP of the electromagnetic solenoid 50 acts such that the pinion gear 62 moves toward the ring gear 68. The urging force FB of the spring 55 acts in a direction opposite to the direction in which the pushing force FP of the electromagnetic solenoid 50 acts, to cause the pinion gear 62 to be distanced from the ring gear 68. The urging force FB is in proportion to the displacement of the pinion gear 62 (plunger 54), while the pushing force FP is in inverse proportion to the square of the distance between the solenoid coil 52 and the plunger 54.

There is an issue of damage and noise caused by the collision occurring during the movement of the pinion gear 62. Referring to FIG. 3, the collision occurring during the movement of the pinion gear 62 will be described.

In the first place, when the pinion gear 62 is pushed out by the electromagnetic solenoid 50 and brought into contact with the ring gear 68, a collision occurs between the pinion gear 62 and the ring gear 68. In the second place, after the start of engagement between the pinion gear 62 and the ring gear 68, the stop ring 65 for limiting the position of the pinion gear 62 to the connection position contacts the pinion gear 62. In this case, a collision occurs between the pinion gear 62 and the stop ring 65. In the third place, when the pinion gear 62 is pushed out, the plunger 54 collides with the stopper 56 for limiting the movement of the plunger 54. Finally, after disengagement of the pinion gear 62 from the ring gear 68, the pinion gear 62 is allowed to retract to the initial position by the spring 55. In this case, the connecting member 67 collides with a stopper 82 (corresponding to the first limiting member) for limiting the movement of the connecting member 67.

The control circuit 41 of the present embodiment controls the output current of the DC-DC converter 46 to control the current I (solenoid current I) passed through the electromagnetic solenoid 50. Thus, the control circuit 41 controls the pushing force FP acting on the pinion gear 62 and the members connected to the pinion gear 62 (the plunger 54, the shift lever 66 and the connecting member 67).

Specifically, immediately before contact of the pinion gear 62 with the ring gear 68, the control circuit 41 reduces the solenoid current I to mitigate the collision between the pinion gear 62 and the ring gear 68. Furthermore, the control circuit 41 reduces the solenoid current I during the period that includes the point when the pinion gear 62 contacts the stop ring 65, to mitigate the collision between the pinion gear 62 and the stop ring 65 and also to mitigate the collision between the plunger 54 and the stopper 56. After disengagement of the pinion gear 62 from the ring gear 68, the control circuit 41 passes a predetermined current as the solenoid current I through the solenoid coil before the pinion gear 62 is allowed to retract to the initial position by the urging force FB of the spring 55. Thus, the control circuit 41 contributes to cancelling the urging force FB of the spring 55 and mitigating the collision between the connecting member 67 connected to the pinion gear 62 and the stopper 82.

Figure 5:
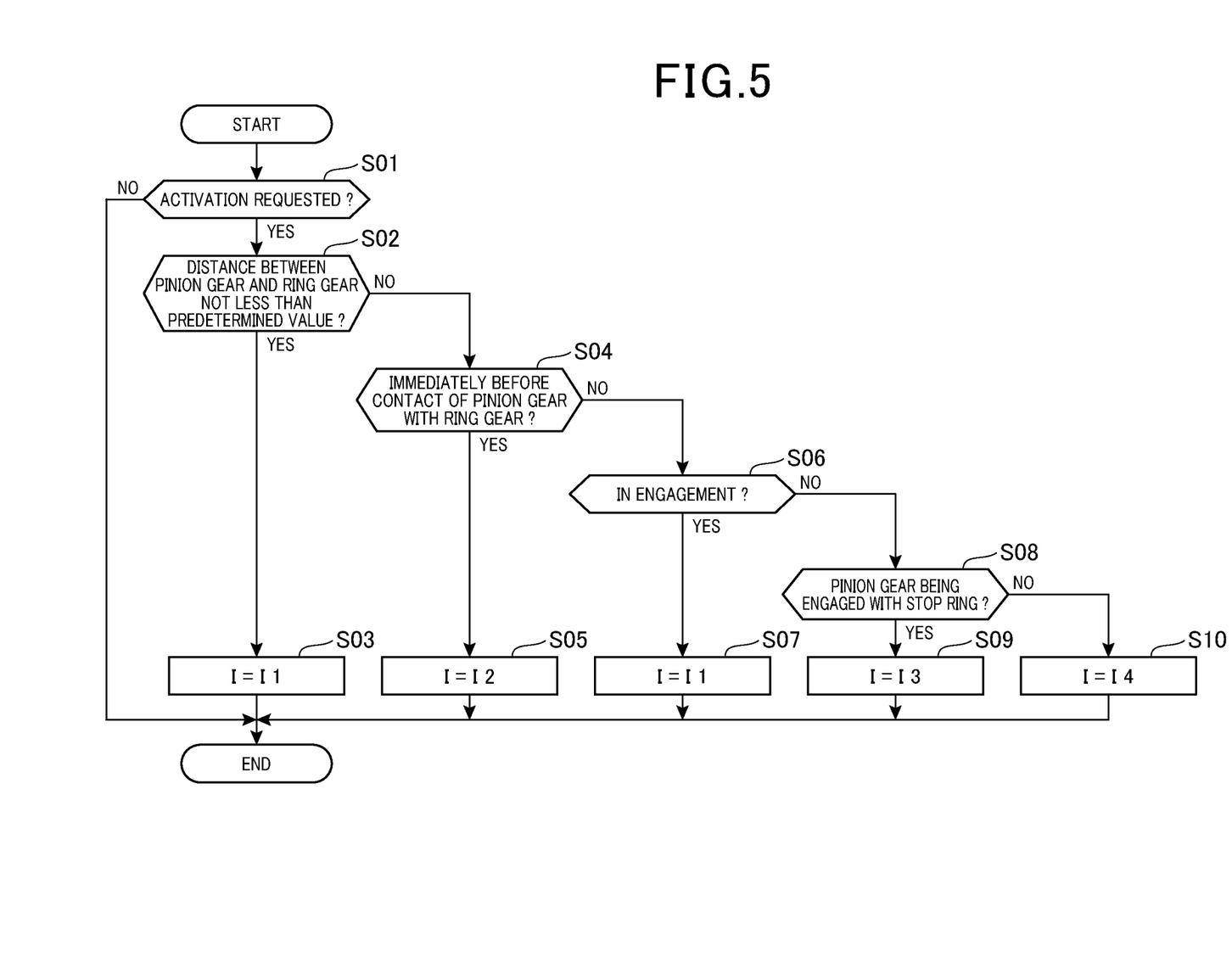
FIG. 5 is a flow diagram illustrating a process of pushing out the pinion gear.

FIG. 5 is a flow diagram illustrating a process of pushing the pinion gear 62. The present process is cyclically executed at intervals by the control circuit 41.

At step S01, it is determined whether there is a starter activation request. The starter activation request occurs when start-up of the engine 110 is requested in the vehicle 100. The start-up request of the engine 110 occurs when there is an acceleration request or when the motor-generator 112 generates electrical power due to the lowering of SOC (state of charge: charge ratio) in the high-voltage battery 44. The starter activation request is inputted from the engine ECU 20. In the absence of the starter activation request (NO at step S01), the present process is terminated.

When there is a starter activation request (YES at step S01), control proceeds to step S02 where it is determined whether the distance between the pinion gear 62 and the ring gear 68 is a predetermined distance or more. If it is determined that the distance between the pinion gear 62 and the ring gear 68 is a predetermined distance or more (YES at step S02), control proceeds to step S03 where the current passed through the electromagnetic solenoid 50 is set to I1 and then the process is terminated.

If the distance between the pinion gear 62 and the ring gear 68 is not a predetermined distance or more (NO at step S02), control proceeds to step S04 where it is determined whether the pinion gear 62 is at a point immediately before contacting the ring gear 68. If the pinion gear 62 is at a point immediately before contacting the ring gear 68 (YES at step S04), control proceeds to step S05 where the solenoid current I is set to I2 (<I1) to reduce the solenoid current I by a predetermined amount, and then the process is terminated.

If the pinion gear 62 is not immediately before contacting the ring gear 68 (NO at step S04), control proceeds to step S06 where it is determined whether the pinion gear 62 is in engagement with the ring gear 68 after contacting thereto. If the pinion gear 62 is in engagement with the ring gear 68

(YES at step S06), control proceeds to step S07 where the solenoid current I is set to I1 to increase the solenoid current I by a predetermined amount, and then the process is terminated.

If the pinion gear 62 is not in engagement with the ring gear 68 (NO at step S06), control proceeds to step S08 where it is determined whether the pinion gear 62 is in contact with the stop ring 65. If the pinion gear 62 is in contact with the stop ring 65 (YES at step S08), control proceeds to step S09 where the solenoid current I is set to I3 (<I1) to reduce the solenoid current I by a predetermined amount, and then the process is terminated.

If the pinion gear 62 is not in contact with the stop ring 65 (NO at step S08), the engagement between the pinion gear 62 and the ring gear 68 is retained to transmit rotation of the pinion gear 62 to the ring gear 68. Accordingly, control proceeds to step S10 where the solenoid current I is set to I4 (I1>I2>I4>I3), and then the process is terminated.

Figure 6:
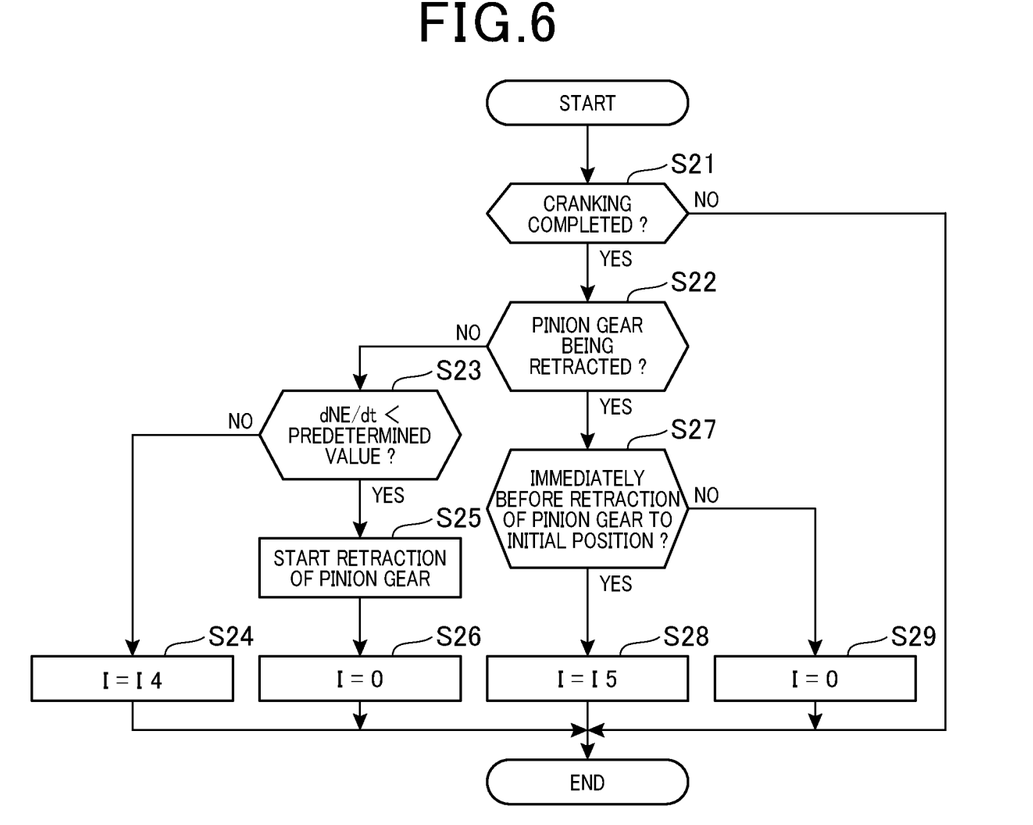
FIG. 6 is a flow diagram illustrating a process of retracting the pinion gear.

FIG. 6 is a flow diagram illustrating a process of retracting the pinion gear 62. The present process is cyclically executed at intervals by the control circuit 41.

At step S21, it is determined whether cranking has been completed. The term "cranking has been completed" refers to the starter activation request having ceased but the pinion gear 62 is yet to retract to the initial position. If cranking has not been completed (NO at step S21), the process is terminated.

If cranking has been completed (YES at step S21), control proceeds to step S22 where it is determined whether the process of retracting the pinion gear 62 has started. If the pinion gear 62 is not in the process of being retracted to the initial position (NO at step S22), control proceeds to step S23 where it is determined whether the temporal variation of the engine speed (dNE/dt) is less than a predetermined value. If the temporal variation of the engine speed is equal to or more than the predetermined value (NO at step S23), control proceeds to step S24 where the solenoid current I is set to I4 to retain the engagement between the pinion gear 62 and the ring gear 68. If the temporal variation of the engine speed is less than the predetermined value (YES at step S23), control proceeds to step S25 where the process of retracting the pinion gear 62 is started and then at step S26, the solenoid current I is set to 0.

If the process of retracting the pinion gear 62 has started (YES at step S22), control proceeds to step S27 where it is determined whether the pinion gear 62 is at a point immediately before retracting to the initial position. If the pinion gear 62 is not immediately before retracting to the initial position (NO at step S27), control proceeds to step S29 where the solenoid current I is set to 0, and then the process is terminated. If the pinion gear 62 is at a point immediately before retracting to the initial position (YES at step S27), control proceeds to step S28 where the solenoid current I is set to I5 (I4>I5) so that the predetermined current I5 is passed through the electromagnetic solenoid 50, and then the process is terminated.

Figure 7:
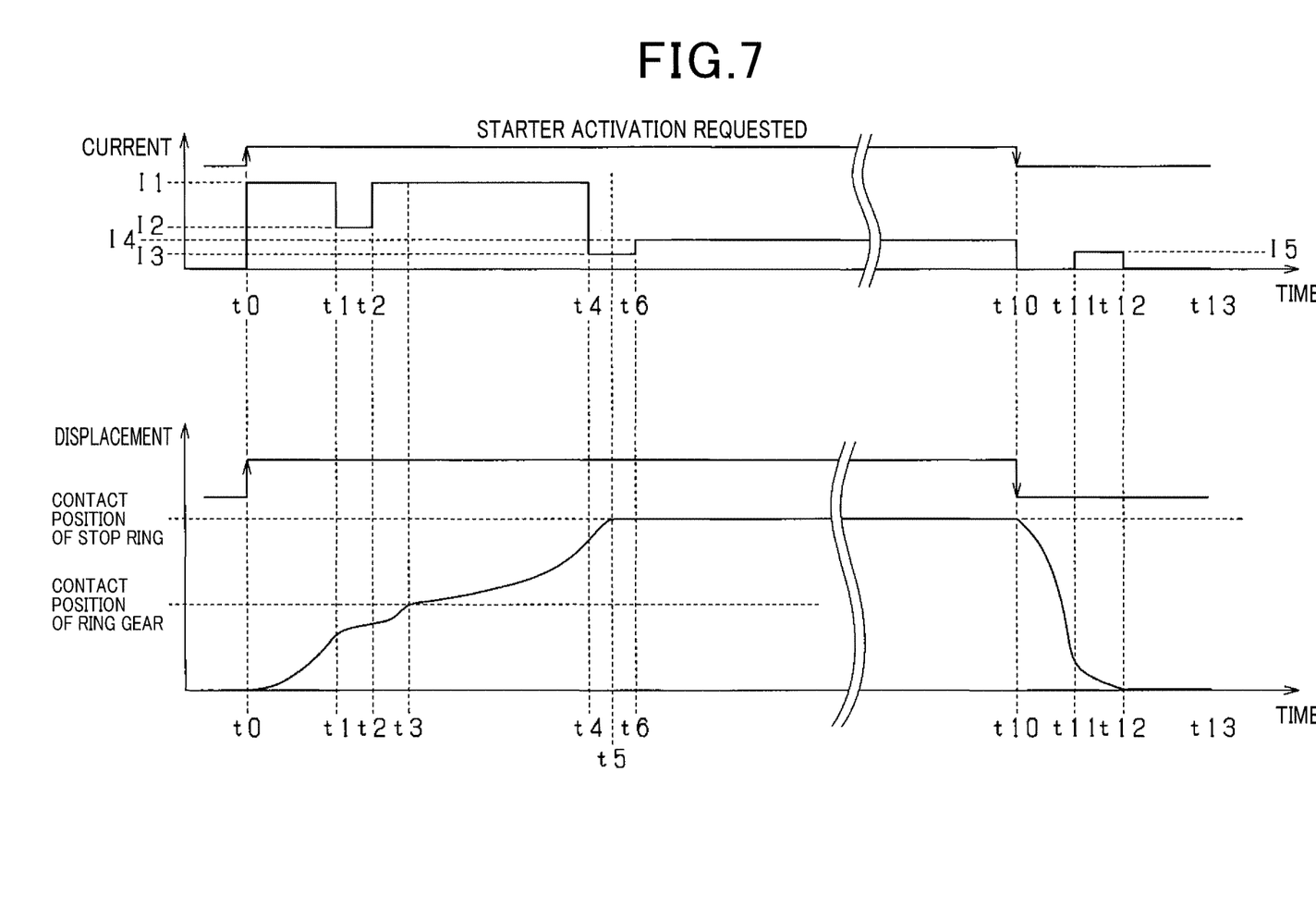
FIG. 7 is a timing diagram illustrating the processes of pushing out and retracting the pinion gear.

FIG. 7 is a timing diagram illustrating variation of the current I passed through the electromagnetic solenoid 50 and position (displacement) of the pinion gear 62 when the control shown in FIGS. 5 and 6 is executed.

Upon occurrence of a starter activation request at time t0, the solenoid current I is set to I1 from 0. With the solenoid current I being set to I1, the pinion gear 62 approaches the ring gear 68 while being accelerated. At time t1, the distance between the pinion gear 62 and the ring gear 68 becomes equal to the predetermined distance. Since this corresponds to the point immediately before the pinion gear 62 and the ring gear 68 contact with each other, the solenoid current I decreases to I2 from I1. Accordingly, the pushing force FP acting on the pinion gear 62 becomes smaller than the urging force FB and thus the movement speed of the pinion gear 62 in the axial direction decreases.

The movement speed of the pinion gear 62 becomes substantially 0, while at time t2, that is the point immediately before contact of the pinion gear 62 with the ring gear 68, the solenoid current I increases to I1 from I2. Accordingly, the pushing force FP acting on the pinion gear 62 becomes larger than the urging force FB, so that the pinion gear 62 contacts the ring gear 68. Then, at time t3, the pinion gear 62 starts engaging with the ring gear 68. During the period from time t3 to time t4, the pinion gear 62 is pushed against the ring gear 68 such that the teeth of the pinion gear 62 mesh with the grooves of the ring gear 68.

At time t4 corresponding to the point immediately before contact of the pinion gear 62 with the stop ring 65, the solenoid current I is set to I3. Accordingly, the pushing force FP acting on the pinion gear 62 becomes substantially equal to the sum of the urging force FB and the frictional force, thereby decreasing acceleration of the pinion gear 62. Then, at time t5, the pinion gear 62 contacts the stop ring 65, the position of which is the connection position of the pinion gear 62.

At time t6 after lapse of a predetermined time following positioning of the pinion gear 62 at the connection position, the solenoid current I is set to I4, so that the pinion gear 62 is fixed at the connection position. In this state, engagement between the pinion gear 62 and the ring gear 68 is retained to crank the engine.

At time t10, cranking is completed and the starter activation request ceases. At the same time, when variation of the engine speed becomes lower than the predetermined value, the solenoid current I is set to 0. Resultantly, of the pushing and urging forces FP and FB, only the urging force FB acts on the pinion gear 62, and the pinion gear 62 is retracted to the initial position.

At time t11, that is the point immediately before the pinion gear 62 retracts to the initial position, the solenoid current I is set to I5 Accordingly, the pushing force FP becomes larger than the urging force FB and thus the movement speed of the pinion gear 62 in the axial direction decreases. Then, at time t12, the pinion gear 62 is located at the initial position, and the connecting member 67 is brought into contact with the stopper 82. The operation as described above can mitigate the impact caused when the pinion gear 62 is pushed toward the ring gear 68, and the impact caused when the pinion gear 62 is retracted from the ring gear 68 to the initial position.

The present embodiment is configured such that the start-up period of the engine 110 is determined depending on the type of the start-up trigger that generates a start-up request for the engine 110. Furthermore, in the present embodiment, the current supplied to the motor 30 is configured to be set based on the start-up period to control at least either of the rotation speed and the output torque of the motor 30. The start-up trigger that generates a start-up request for the engine 110 in a hybrid vehicle (vehicle 100) may be an acceleration request for the vehicle 100, an electrical power generation request made when the SOC of the high-voltage battery 44 has lowered, a temperature rise request for the cooling water, an activation request for the heater (not shown), or the like.

The engine start-up action triggered by an acceleration request for the vehicle 100 needs more responsiveness compared to the engine start-up action triggered by other start-up triggers. To cope with this need, when the engine 110 is started following an acceleration request for the vehicle 100, a start-up period of the engine 110 is ensured to be shorter compared to when the engine 110 is started following other start-up triggers. Furthermore, when the engine 110 is started following an acceleration request for the vehicle 100, the start-up period is ensured to be determined based on accelerator manipulated variable as an acceleration request, and temporal variation of the accelerator manipulated variable.

Figure 8:
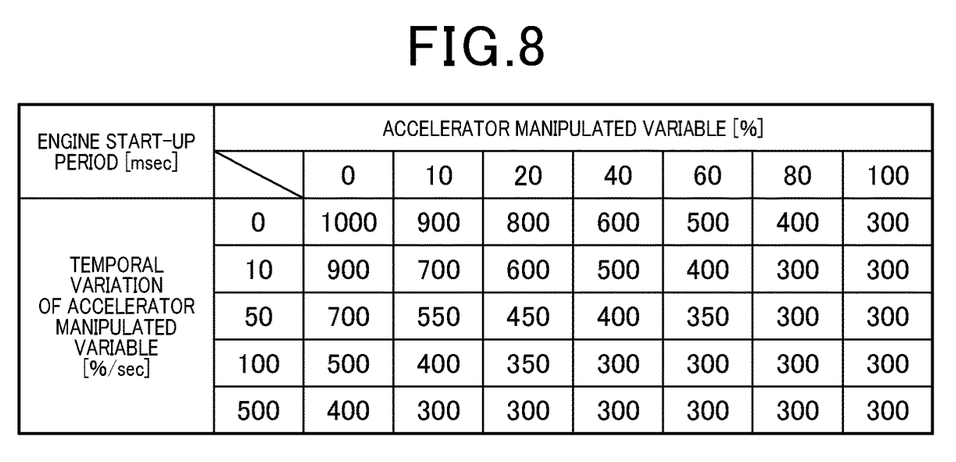
FIG. 8 is a diagram illustrating a map correlating an accelerator manipulated variable and temporal variation of the accelerator manipulated variable, with engine start-up period.

FIG. 8 is a map showing correlation between accelerator manipulated variable (%), temporal variation of accelerator manipulated variable (%/sec), and engine start-up period (msec). As the accelerator manipulated variable becomes larger, the engine start-up period is set to be shorter. As the temporal variation of the accelerator manipulated variable becomes larger, the engine start-up period is set to be shorter. In the present embodiment, the accelerator manipulated variable is expressed by a ratio of the actual value of manipulated variable to the maximum value thereof.

The present embodiment is configured to implement control such that the rotation speed of the motor 30 becomes lower and the output torque becomes smaller, as the engine start-up period becomes longer. Under this control scheme, the occurrence of noise is reduced or prevented at the time of activating the starter 10.

Figure 9:
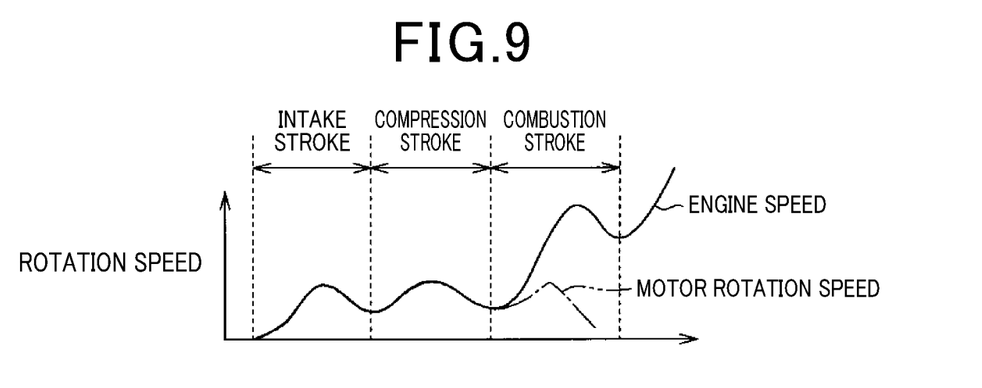
FIG. 9 is a timing diagram illustrating temporal variation of engine speed and motor rotation speed when the cranking period is long.

FIG. 9 is a timing diagram illustrating rotation speed of motor and engine speed at the time of activating the starter (at the time of cranking).

The engine 110, i.e. a four-stroke engine, carries out four strokes of an intake stroke, a compression stroke, a combustion stroke and an exhaustion stroke. At the time of normal engine start-up, starter activation (cranking) is performed until the intake stroke and the compression stroke are completed. Following completion of the compression stroke, the combustion stroke is started to start the engine 110. As shown in FIG. 9, it is so configured that the piston stays still near the top dead point in any of the cylinders configuring the engine 110, in the state where the engine 110 is stopped. With this configuration, startability of the engine 110 will be improved.

When an engine having a plurality of cylinders (e.g., four-cylinder engine) is started, an intake stroke is performed in a first cylinder, during which a compression stroke is performed in a second cylinder. Then, while the compression stroke is performed in the first cylinder, an expansion stroke with no combustion is performed in the second cylinder. In the expansion stroke, the air compressed during the compression stroke of the second cylinder expands in the second cylinder. The expansion of the air imparts torque to the crank shaft 70 of the engine 110. There is a concern that, with the torque being imparted, the engine 110 will have a rotation speed (rotation speed of the crank shaft 70) that temporarily exceeds the rotation speed of the motor 30.

Figure 10:
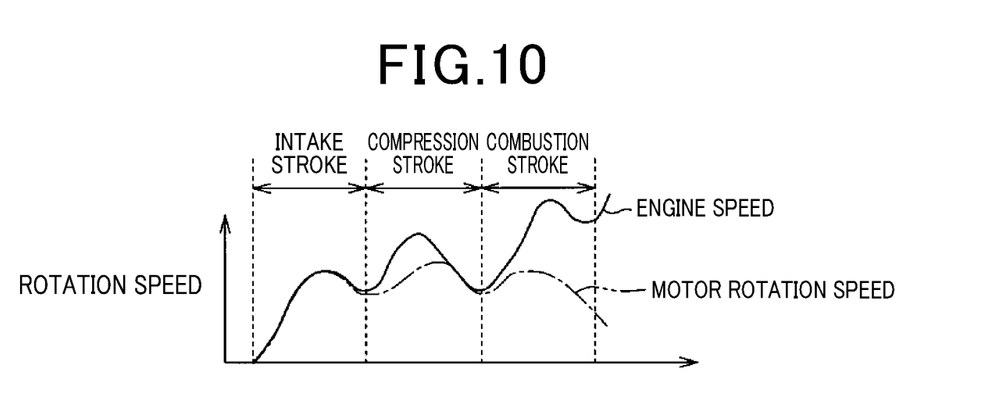
FIG. 10 is a timing diagram illustrating temporal variation of engine speed and motor rotation speed when the cranking period is short.

FIG. 10 is a timing diagram illustrating rotation speed of the motor 30 and engine speed at the time of activating the starter in the case where the set start-up period is short and the output torque of the motor 30 is large.

At the start-up of the engine 110, when an expansion stroke is started in any of the cylinders configuring the engine 110, torque is imparted to the crank shaft 70 by the internal pressure of the cylinder in question. If the start-up period is short and the output torque of the motor 30 is large, the rotation speed of the crank shaft 70 drastically changes and accordingly the rotation speed of the crank shaft 70 in the expansion stroke (compression stroke of FIG. 10) also drastically changes. Thus, the start of the expansion stroke may create a situation where the rotation speed of the crank shaft 70 exceeds the rotation speed of the motor 30. Then, with the completion of the expansion stroke, the rotation speed of the crank shaft 70 again agrees with the rotation speed of the motor 30.

Thus, in the case where the rotation speed of the motor 30 changes in a "0 to a negative value, then to 0" manner relative to the rotation speed of the crank shaft 70, a large force is applied to the one-way clutch 60 at the point when the relative rotation speed of the motor 30 changes in a "a negative value to 0" manner. There is a concern that this large force may generate noise and shorten the life of the one-way clutch 60.

Figure 11:
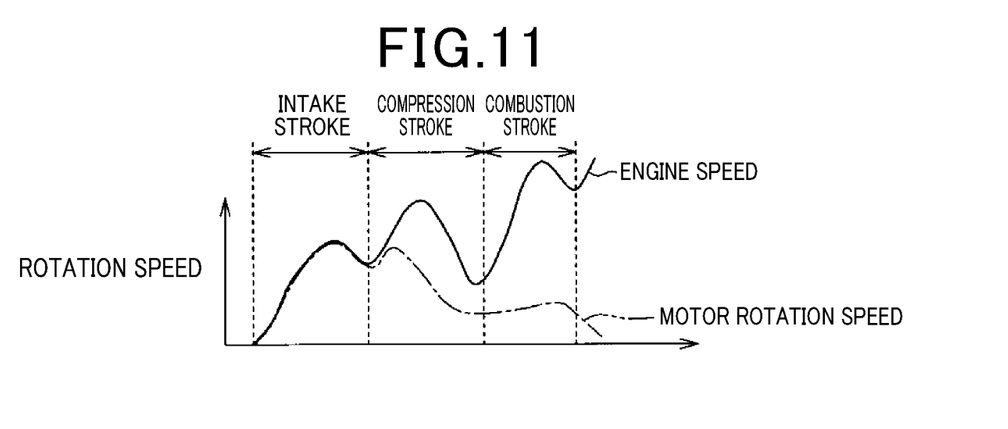
FIG. 11 is a timing diagram illustrating temporal variation of engine speed and motor rotation speed when cranking is completed before completion of expansion strokes in other cylinders.

As a measure against this, under the control shown in FIG. 11, cranking is ensured to be completed before start of the expansion stroke (compression stroke of FIG. 11) and the speed of the motor 30 relative to that of the crank shaft 70 is retained to be negative, so that reconnection of the one-way clutch 60 is prevented. Specifically, the output torque of the motor 30 is increased to complete cranking through torque transmission from the pinion gear 62 to the ring gear 68, before substantial start of the expansion stroke (compression stroke of FIG. 11).

The expression "to complete cranking" herein refers to "to impart energy to the crank shaft 70, which is required for completing the compression stroke of FIG. 11, before proceeding to the combustion stroke". In this way, transfer to the combustion stroke can be achieved, with the rotation speed of the motor 30 relative to that of the crank shaft 70 being retained to be negative. In other words, the noise is prevented from being generated in the starter 10, or the life of the starter 10 is prevented from being shortened.

Figure 12:
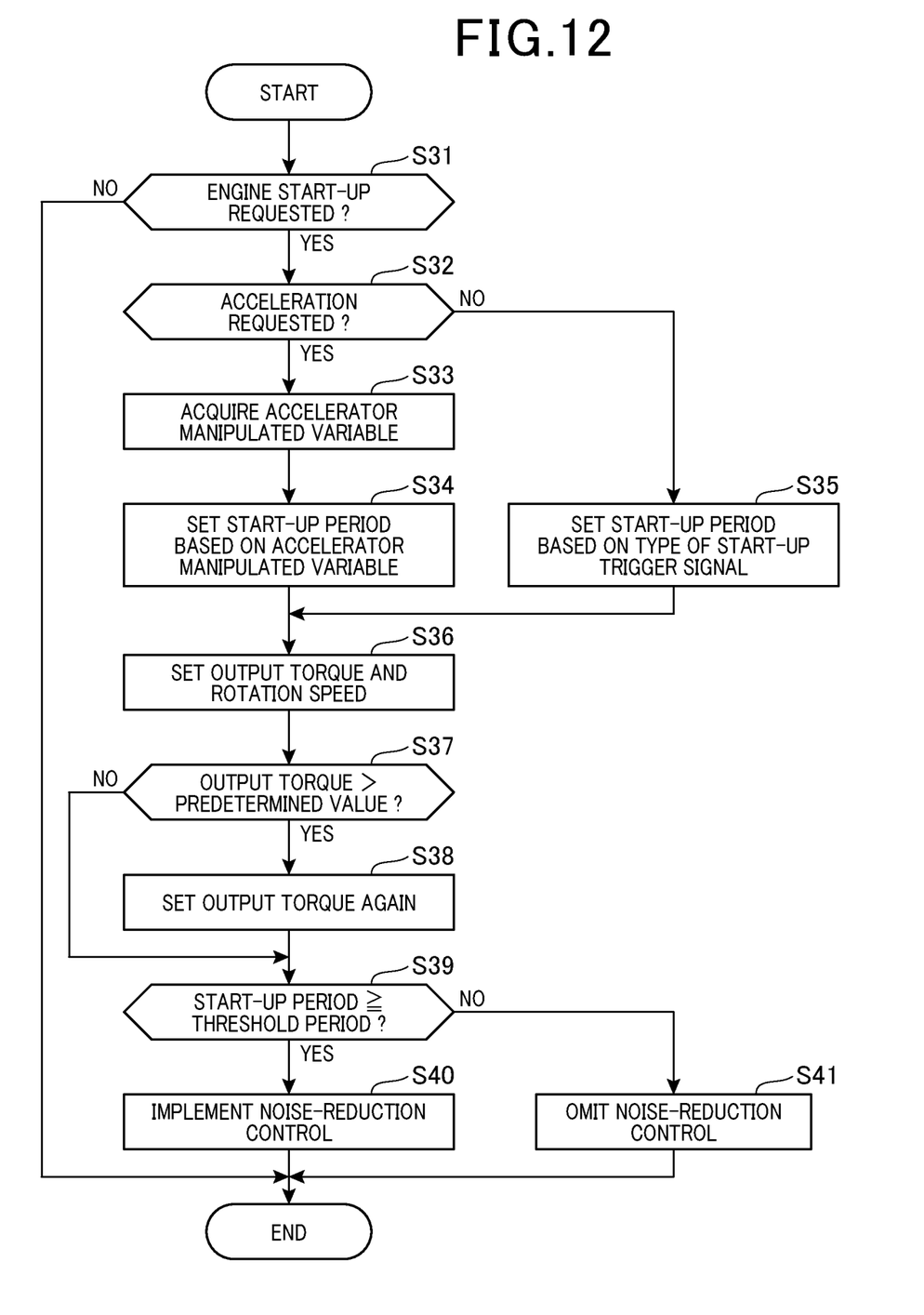
FIG. 12 is a flow diagram illustrating a process of setting output torque and rotation speed of motor.

FIG. 12 is a flow diagram illustrating a process of setting start-up period of the engine 110 and setting output torque and rotation speed of the motor 30. The present process is cyclically executed by the control circuit 41. This process may be shared between the engine ECU 20 and the control circuit 41.

At step S31, it is determined where there is an engine start-up request. In the absence of the engine start-up request (NO at step S31), the present process is terminated. If there is an engine start-up request (YES at step S31), control proceeds to step S32 where it is determined whether the engine start-up request has been triggered by an acceleration request for the vehicle 100. If the engine start-up request has been triggered by a plurality of start-up triggers including an acceleration request for the vehicle 100, the control circuit 41 determines that the engine start-up request has been triggered by an acceleration request for the vehicle 100.

If the engine start-up request has been triggered by an acceleration request for the vehicle 100 (YES at step S32), control proceeds to step S33 where the control circuit 41 acquires accelerator manipulated variable and temporal variation of the accelerator manipulated variable. At step S34, a start-up period of the engine 110 is set based on the accelerator manipulated variable and the temporal variation of the accelerator manipulated variable, and the map of FIG. 8.

If the engine start-up request has not been triggered by an acceleration request for the vehicle 100 (NO at step S32), control proceeds to step S35 where a start-up period is set based on the type of the start-up trigger. At this step, if the engine start-up request has been triggered by a plurality of start-up triggers, a start-up period is set based on one requiring the shortest start-up period, among the plurality of start-up triggers. At step S36, the output torque and the rotation speed of the motor 30 are set based on the start-up period of the engine 110 set at step S34 or S35. Specifically, as the start-up period is set to be longer, the rotation speed of the motor 30 is set to be lower and the output torque is set to be smaller. It should be noted that, as the start-up period is set to be longer, either of the rotation speed and the output torque of the motor 30 may be set to be lower or smaller.

At step S37, it is determined whether the output torque set at step S36 is larger than a predetermined value. If the output torque is larger than the predetermined value (YES at step S37), control proceeds to step S38 where the output torque is set for the second time. Specifically, before start of an expansion stroke with no combustion in any of the cylinders constituting the engine 110, the control circuit 41 sets an output torque again with an increase that enables impartment of energy, which is needed for completing a compression stroke, to the crank shaft 70. Consequently, the combustion stroke is achieved, with the rotation speed of the motor 30 relative to that of the crank shaft 70 being retained to be negative.

Following the setting of the output torque at step S38, or if the output torque is set to be equal to or less than the predetermined value at step S37 (NO at step S37), control proceeds to step S39 where the start-up period is compared with a predetermined threshold period. If the start-up period is equal to or more than the threshold period (YES at step S39), control proceeds to step S40 where the control circuit 41 determines noise-reduction control (shown in FIG. 5) to be implemented at the time of pushing out the pinion gear 62, and then terminates the process. If the start-up period is shorter than the threshold period (NO at step S39), the control circuit 41 determines that noise-reduction control (shown in FIG. 5) should be omitted at the time of pushing out the pinion gear 62 (step S41), and then terminates the process.

The expression "determines that noise-reduction control should be omitted at the time of pushing out the pinion gear 62" specifically refers to omitting steps S02 to S09 of FIG. 5. That is, after the occurrence of an activation request for the starter 10, the solenoid current I is constantly set to I1 up until when the pinion gear 62 is brought into contact with the stop ring 65.

If the start-up period is equal to or more than the threshold period (YES at step S39), and noise-reduction control (shown in FIG. 5) is implemented at step S40 at the time of pushing out the pinion gear 62, the control of steps S08 and S09 may be omitted. Specifically, it may be so configured that, when the pinion gear 62 contacts the ring gear 68, only the control of reducing the solenoid current I to I2 from I1 may be implemented in the period when the distance between the pinion gear 62 and the ring gear 68 is in a predetermined range.

Similarly, if the start-up period is equal to or more than the threshold period (YES at step S39), and noise-reduction control (shown in FIG. 5) is implemented at step S40 at the time of pushing out the pinion gear 62, the control of steps S04 and S05 may be omitted. Specifically, it may be so configured that, when the pinion gear 62 contacts the stop ring 65, only the control of reducing the solenoid current I to I3 from I1 may be implemented in the period when the distance between the pinion gear 62 and the stop ring 65 is in a predetermined range.

By executing the noise-reduction process when pushing out the pinion gear 62 if the start-up period is equal to or more than the predetermined period (threshold period), startability of the starter 10 and low noise at the start-up are both ensured.

The following description addresses advantageous effects of the present embodiment.

In the configuration described above, a predetermined current I5 passed through the electromagnetic solenoid 50 after disengagement of the ring gear 68 from the pinion gear 62 i.e. before retraction of the connecting member 67 connected to the pinion gear 62 to the predetermined position. This allows the pushing force FP to act on the pinion gear 62 and the connecting member 67 in a direction opposite to that of the urging force FB. Accordingly, acceleration of the pinion gear 62 and the connecting member 67 is reduced, thereby mitigating the impact caused by the collision of the connecting member 67 with the stopper 82 and minimizing generation of noise, when the connecting member 67 is retracted to the predetermined position.

The present embodiment is so configured that a predetermined current I5 is passed through the electromagnetic solenoid 50 at a point immediately before the connecting member 67 abuts against the stopper 82. With this configuration, the connecting member 67 is promptly retracted to the predetermined position, and the impact caused by the collision of the connecting member 67 with the stopper 82 is minimized. Furthermore, the appropriate settings of the magnitude of the solenoid current I and the period of passing the solenoid current I can contribute to saving electrical power.

The present embodiment is configured to implement control of reducing the pushing force FP applied by the electromagnetic solenoid 50, when the pinion gear 62 is brought into contact with the ring gear 68. With this configuration, the impact caused by the collision between the pinion gear 62 and the ring gear 68 is minimized, while they are brought into engagement with each other, and generation of noise is minimized.

The present embodiment is configured to implement control of reducing the pushing force FP applied by the electromagnetic solenoid 50, during a period when the distance between the pinion gear 62 and the stop ring 65 is in a predetermined range after start of engagement between the pinion gear 62 and the ring gear 68. With this configuration, while the pinion gear 62 is moved to a predetermined connection position, the impact caused by the collision between the pinion gear 62 and the stop ring 65 is minimized, and generation of noise is minimized.

In the present embodiment, the current I passed through the electromagnetic solenoid 50 is reduced in the period when the ring gear 68 is in engagement with the pinion gear 62, compared to the period before engagement. More specifically, under the control implemented in the present embodiment, the pushing force FP applied by the electromagnetic solenoid 50 is reduced, while being made larger than the urging force FB applied by the spring 55. Thus, power consumption of the electromagnetic solenoid 50 is reduced, and the contact between the pinion gear 62 and the ring gear 68 is retained, thereby contributing to saving electrical power.

In the present embodiment, disengagement of the pinion gear 62 from the ring gear 68 is started in a period when the temporal variation of the rotation speed of the crank shaft 70 is smaller than a predetermined value.

The present embodiment is configured to set a start-up period of the engine 110 depending on the type of the start-up trigger, and to control at least one of the rotation speed and the output torque of the motor 30 based on the start-up period. Thus, startability of the engine 110 and low noise of the starter 10 are both ensured. For example, if the engine is required to be urgently started up, priority is given to the engine start-up by increasing at least one of the rotation speed and the output torque of the motor 30. If the engine is not required to be urgently started up, priority is given to the noise reduction of the starter 10 by decreasing at least one of the rotation speed and the output torque of the motor 30.

Other Embodiments

The motor 30 may be a direct-current motor to thereby omit the inverter 40 and also to omit the control of the rotation speed and the output torque of the motor 30.

Step S04 of FIG. 5 may be omitted and the pinion gear 62 may be brought into contact with the ring gear 68 without being decelerated. Similarly, at step S08, the pinion gear 62 may be brought into contact with the stop ring 65 without being decelerated.

Step S23 of FIG. 6 may be omitted to retract the pinion gear 62 simultaneously with the completion of cranking.

In the embodiment described above, the start-up period of the engine 110 has been set based on accelerator manipulated variable and temporal variation of the accelerator manipulated variable. However, this may be altered. Specifically, the start-up period of the engine 110 may be set only based on the temporal variation of the accelerator manipulated variable. Alternatively, the start-up period of the engine 110 may be set only based on the accelerator manipulated variable.

At steps S37 and S38 of FIG. 12, the output torque has been further increased if it is larger than a predetermined value, so that cranking is completed before start of the expansion stroke with no combustion stroke in any of the cylinders constituting the engine 110. Alternative to this configuration, the output torque may be increased if the start-up period is shorter than a predetermined value, so that cranking is completed before start of the expansion stroke with no combustion stroke in any of the cylinders constituting the engine 110. With this alternative configuration as well, the rotation speed of the pinion gear 62 relative to that of the crank shaft 70 (ring gear 68) may be prevented from changing in a "0 to a negative value" manner. Specifically, transfer to the combustion stroke can be achieved, with the rotation speed of the motor 30 relative to that of the crank shaft 70 being retained to be negative.

The present disclosure has been described with reference to embodiments. However, the present embodiment should not be construed as being limited to these embodiments or the structures thereof. The present embodiment should encompass various modifications, or alterations within the equivalent scope. In addition, various combinations or modes of the embodiments, or other combinations including one or more components thereof should be in the technical idea of the present disclosure.

PARTIAL DESCRIPTION OF REFERENCE SIGNS

10 . . . Starter
30 . . . Motor
41 . . . Control circuit
50 . . . Electromagnetic solenoid
55 . . . Spring
62 . . . Pinion gear
67 . . . Connecting member
68 . . . Ring gear
70 . . . Crank shaft
82 . . . Stopper
110 . . . Engine

What is claimed is:

1. A starter mounted to a vehicle to start an engine, comprising:
   a pushing member that pushes a pinion gear toward a ring gear connected to an output shaft of the engine, using an electromagnetic force generated by current being passed through a solenoid to bring the ring gear into engagement with the pinion gear;
   an urging member that urges the pinion gear in a direction opposite to the direction into which the pinion gear is pushed out by the pushing member;
   a predetermined member connected to the pinion gear;
   a first limiting member that limits movement of the predetermined member urged by the urging member, to a predetermined position, before the pinion gear is pushed out by the pushing member; and
   a control unit that disengages the ring gear from the pinion gear under an urging action of the urging member and implements control of passing a predetermined current through the solenoid when the predetermined member is retracted to the predetermined position, the predetermined current being passed through the solenoid after disengagement of the ring gear from the pinion gear but before retraction of the predetermined member to the predetermined position.

2. The starter according to claim 1, wherein the control unit passes the predetermined current through the solenoid after disengagement of the ring gear from the pinion gear but immediately before contact of the predetermined member with the first limiting member.

3. The starter according to claim 1, wherein the predetermined member and the first limiting member are provided coaxially with the pinion gear.

4. The starter according to claim 1, wherein, when the pinion gear is brought into contact with the ring gear, the control unit implements control of reducing current passed through the solenoid by a predetermined amount during a period when a distance between the pinion gear and the ring gear is in a predetermined range.

5. The starter according to claim 1, wherein:
   the starter comprises a second limiting member that limits movement of the pinion gear due to an electromagnetic force that is generated by current being passed through a solenoid, in a state where the ring gear is in engagement with the pinion gear; and
   when the pinion gear is brought into contact with the second limiting member, the control unit implements control of reducing current passed through the solenoid by a predetermined amount during a period when a distance between the pinion gear and the second limiting member is in a predetermined range.

6. The starter according to claim 1, wherein the control unit reduces current passed through the solenoid during a period when the ring gear is in engagement with the pinion gear, compared to a period when the ring gear is yet to engage with the pinion gear, to reduce the pushing force applied by the pushing member, and increases the pushing force applied by the pushing member more than the urging force applied by the urging member.

7. The starter according to claim 1, wherein the control unit reduces current passed through the solenoid and reduces the pushing force applied by the pushing member more than the urging force applied by the urging member, to disengage the ring gear from the pinion gear and retract the predetermined member to the predetermined position.

8. The starter according to claim 1, wherein the control unit sets a start-up period of the engine depending on the type of a start-up trigger that generates a start-up request for the engine, and sets a current supplied to the motor for rotating the pinion gear, based on the start-up period, to control at least one of rotation speed of the motor and output torque of the motor.

9. The starter according to claim 8, wherein, when the start-up trigger is triggered by an acceleration request for the vehicle, the control unit sets the start-up period to be shorter compared to start-up periods set based on start-up triggers other than the start-up trigger caused by the acceleration request.

10. The starter according to claim 9, wherein, when the start-up trigger is triggered by the acceleration request, the control unit sets the start-up period based on accelerator manipulated variable as the acceleration request and temporal variation of the accelerator manipulated variable.

11. The starter according to claim 2, wherein the predetermined member and the first limiting member are provided coaxially with the pinion gear.

12. The starter according to claim 11, wherein, when the pinion gear is brought into contact with the ring gear, the control unit implements control of reducing current passed through the solenoid by a predetermined amount during a period when a distance between the pinion gear and the ring gear is in a predetermined range.

13. The starter according to claim 12, wherein:
the starter comprises a second limiting member that limits movement of the pinion gear due to an electromagnetic force that is generated by current being passed through a solenoid, in a state where the ring gear is in engagement with the pinion gear; and
when the pinion gear is brought into contact with the second limiting member, the control unit implements control of reducing current passed through the solenoid by a predetermined amount during a period when a distance between the pinion gear and the second limiting member is in a predetermined range.

14. The starter according to claim 13, wherein the control unit reduces current passed through the solenoid during a period when the ring gear is in engagement with the pinion gear, compared to a period when the ring gear is yet to engage with the pinion gear, to reduce the pushing force applied by the pushing member, and increases the pushing force applied by the pushing member more than the urging force applied by the urging member.

15. The starter according to claim 14, wherein the control unit reduces current passed through the solenoid and reduces the pushing force applied by the pushing member more than the urging force applied by the urging member, to disengage the ring gear from the pinion gear and retract the predetermined member to the predetermined position.

16. The starter according to claim 3, wherein, when the pinion gear is brought into contact with the ring gear, the control unit implements control of reducing current passed through the solenoid by a predetermined amount during a period when a distance between the pinion gear and the ring gear is in a predetermined range.

17. The starter according to claim 16, wherein:
the starter comprises a second limiting member that limits movement of the pinion gear due to an electromagnetic force that is generated by current being passed through a solenoid, in a state where the ring gear is in engagement with the pinion gear; and
when the pinion gear is brought into contact with the second limiting member, the control unit implements control of reducing current passed through the solenoid by a predetermined amount during a period when a distance between the pinion gear and the second limiting member is in a predetermined range.

18. The starter according to claim 17, wherein the control unit reduces current passed through the solenoid during a period when the ring gear is in engagement with the pinion gear, compared to a period when the ring gear is yet to engage with the pinion gear, to reduce the pushing force applied by the pushing member, and increases the pushing force applied by the pushing member more than the urging force applied by the urging member.

19. The starter according to claim 18, wherein the control unit reduces current passed through the solenoid and reduces the pushing force applied by the pushing member more than the urging force applied by the urging member, to disengage the ring gear from the pinion gear and retract the predetermined member to the predetermined position.

* * * * *